(12) United States Patent
Sun

(10) Patent No.: US 8,650,615 B2
(45) Date of Patent: Feb. 11, 2014

(54) CROSS DOMAIN DELEGATION BY A STORAGE VIRTUALIZATION SYSTEM

(75) Inventor: Mingzhou Joe Sun, Santa Clara, CA (US)

(73) Assignee: EMC Corporation, Hopkinton, MA (US)

( * ) Notice: Subject to any disclaimer, the term of this patent is extended or adjusted under 35 U.S.C. 154(b) by 1331 days.

(21) Appl. No.: 11/906,026

(22) Filed: Sep. 28, 2007

(65) Prior Publication Data

US 2009/0089862 A1    Apr. 2, 2009

(51) Int. Cl.
*G06F 9/46* (2006.01)
(52) U.S. Cl.
USPC ............... 726/4; 726/5; 726/6; 726/7; 726/8
(58) Field of Classification Search
None
See application file for complete search history.

(56) References Cited

U.S. PATENT DOCUMENTS

| | | | |
|---|---|---|---|
| 7,383,288 B2* | 6/2008 | Miloushev et al. | 1/1 |
| 7,421,555 B2* | 9/2008 | Dorey | 711/164 |
| 7,676,829 B1* | 3/2010 | Gui et al. | 726/5 |
| 8,059,821 B1* | 11/2011 | Begen | 380/286 |
| 2002/0112155 A1* | 8/2002 | Martherus et al. | 713/155 |
| 2003/0079014 A1* | 4/2003 | Lubbers et al. | 709/225 |
| 2003/0212806 A1* | 11/2003 | Mowers et al. | 709/229 |
| 2004/0233910 A1* | 11/2004 | Chen et al. | 370/395.5 |
| 2004/0260942 A1* | 12/2004 | Jamieson et al. | 713/201 |
| 2004/0260953 A1* | 12/2004 | Jamieson et al. | 713/202 |
| 2005/0204148 A1* | 9/2005 | Mayo et al. | 713/185 |
| 2005/0223014 A1* | 10/2005 | Sharma et al. | 707/10 |
| 2006/0047928 A1* | 3/2006 | Bhasin et al. | 711/162 |
| 2006/0129654 A1* | 6/2006 | Sato | 709/213 |

OTHER PUBLICATIONS

Hadfield (Lee Hadfield, Dave Hater, Dave Bixler, "Windows NT Server 4 Security Handbook", 1997, ISBN: 078971213), p. 92, 168-169.*
Cone (Cone et al., "Planning for Windows 2000", ISBN: 0735700486, 1999), p. 179.*
Zhao (Zhao et al., "Distributed File System Virtualization Techniques Supporting On-Demand Virtual Machine Environments for Grid Computing" 2006).*

* cited by examiner

*Primary Examiner* — Peter Poltorak
(74) *Attorney, Agent, or Firm* — Dergosits & Noah LLP; Todd A. Noah

(57) ABSTRACT

The present is a system and method for preserving user account security privileges during a migration or re-direction of data from one network attached storage ("NAS") system to another. Certain NAS systems authenticate user accounts using Kerberos Delegation Technology. In addition, some NAS systems feature the ability to constrain delegation to certain services. While effective in limiting access and promoting network security, this constrained delegation restricts the ability of a storage virtualization system to migrate or re-direct data to other NAS systems, especially if the other NAS system resides or is identified by a different domain name. The present invention is a system and method for storing user account credentials that work with the former NAS system, and providing a way to translate these credentials to a new NAS system with a new domain, permitting seamless data migration and re-direction across domains.

20 Claims, 2 Drawing Sheets

CROSS DOMAIN DELEGATION BY A STORAGE VIRTUALIZATION SYSTEM

TECHNICAL FIELD

The present invention relates generally to storage virtualization systems, and specifically, to a system and method for user account authentication and delegation during file re-direction by a storage virtualization system.

BACKGROUND OF THE INVENTION

Storage virtualization systems provide organizations with an effective and efficient way to manage data stored on a network attached storage ("NAS") system. An information technology ("IT") administrator can implement a storage virtualization system to migrate, copy or re-direct user data files from a primary NAS system to a secondary NAS system, without disrupting or involving the user. Storage virtualization systems act as intermediaries between the user's client computer and the primary NAS system, also called the source server. In order to effect seamless operations, storage virtualization systems must be fully compatible with the primary NAS system.

Full compatibility may require seamless integration with a NAS system's security protocols. There are many security protocols used by NAS systems, but one of the more well-known security protocols is based upon the Kerberos delegation protocol. The mechanics of the Kerberos delegation protocol are well understood. It involves a separate dedicated authentication server that establishes a user's identity or account access privileges before the user connects to an application server, rather than a direct interaction and password exchange between the user and the application server. By separating out the authentication process from the application server, the user's security credentials cannot be compromised by the application server. If a user requests access to run secure intranet applications through an internet connection, the Kerberos protocol will require that the external user be authenticated before access is granted. The user will be authenticated by the web server, and the web server will assume the identity of the user as a delegate. The web server communicates with the application server as the user delegate and enables data to pass back to the user. The web server's delegation authority may be limited in time so that access to the application server is closed after that time period ends. This overcomes limitations in direct user password access, where access is indefinite until the user changes the password.

Some NAS systems permit a combination of security protocols. For example, NAS systems may require that an intermediary authenticate the user before the user accesses the Kerberos-protected application server. The intermediary may be the web server in the previous example, or it may be a storage virtualization system. In such a case, the intermediary will first confirm the user's identity with an authentication protocol other than Kerberos, such as SSL, NTLM, RSASecurID or other authentication protocols known in the art. Once the user is authenticated by the intermediary, the intermediary then authenticates using Kerberos. This methodology is termed protocol transition because the authentication is transitioning from a non-Kerberos environment to a Kerberos environment. This type of authentication works with a storage virtualization system because it permits the storage virtualization system to securely impersonate the user and enable data migration or re-direction to a secondary NAS system.

Other NAS systems may be designed to restrict user access to only certain services. This is known in the art as "constrained delegation." Constrained delegation can be applied to storage virtualization systems as well, since storage virtualization systems may sometimes need to impersonate a user account in order to gain access to data files. With constrained delegation, the access privilege of the intermediary storage virtualization system can be restricted to a limited set of services. As such, a NAS system administrator may delegate the intermediary to act on behalf of other users for only specific services on specific servers. This is helpful in network environments where access to sensitive data must be restricted to specific users who are capable of doing limited operations on the data. In the event the intermediary's access is compromised, the damage from a security breach would only be limited to those services to which the storage virtualization system has access.

While constrained delegation is an important security feature of many NAS systems in the market, it does cause problems with some storage virtualization systems. As noted previously, a storage virtualization system can aid an administrator in the migration and re-direction of data. Some storage virtualization systems are used in routine data file storage optimizations, and some are used to migrate data to new servers. This may occur for any number of reasons. For example, during a corporate merger, it is common for the new corporate entity to merge or migrate data from legacy NAS systems. In another example, an organization may consolidate or centralize data assets and will need to migrate data to a new NAS system, and cause future data files to be stored on the new NAS system. In any case, the older NAS system may have been keyed to a specific authentication server, whereas the new NAS system may not be. In addition, the older NAS system may have a different domain name than the new NAS system. As a further complication, user file and account permissions become disrupted by the transfer to the new domain. As such, future interaction with the new NAS system may be prohibited, since the new NAS system may not recognize that the same users are trying to access the same files, just in a new domain location. Some NAS system security protocols simply do not provide the capacity for authentication across different domains. Specifically, the Kerberos delegation protocol does not support delegation across domains.

What is needed is a way to permit data migration and re-direction to a secondary NAS system, while preserving the access controls and permissions already in place. What is needed is added functionality to present storage virtualization systems that will permit this data migration and re-direction without disrupting or involving the user with new security requirements. What is further needed is a way to allow seamless data migration while remaining compatible with current NAS systems and NAS system security protocols, especially in instances where the NAS system has adopted a constrained delegation feature. Additionally, what is needed is a way to permit cross domain delegation using a storage virtualization system.

BRIEF DESCRIPTION OF THE FIGURES

The present invention is illustrated by way of example and not limitation in the figures of the accompanying drawings, in which like references indicate similar elements, and in which.

DETAILED DESCRIPTION OF THE INVENTION

An embodiment of the present invention provides a system and method for providing cross domain user authentication by a storage virtualization system. Aspects of the present invention provide a way to seamlessly migrate or re-direct data files from one NAS system (the "source" or "source server") to a second NAS system (the "destination" or "destination server") while preserving access controls already in place from the source server. Aspects of the present invention enable cross domain delegation to provide secure access to both the source server and the destination server. In the disclosure herein, exemplar embodiments of the present invention are described in order to merely illustrate various aspects of the present invention. One will appreciate that other embodiments not described herein are possible without departing from the spirit of the present invention or the scope of this disclosure.

Figure 1:
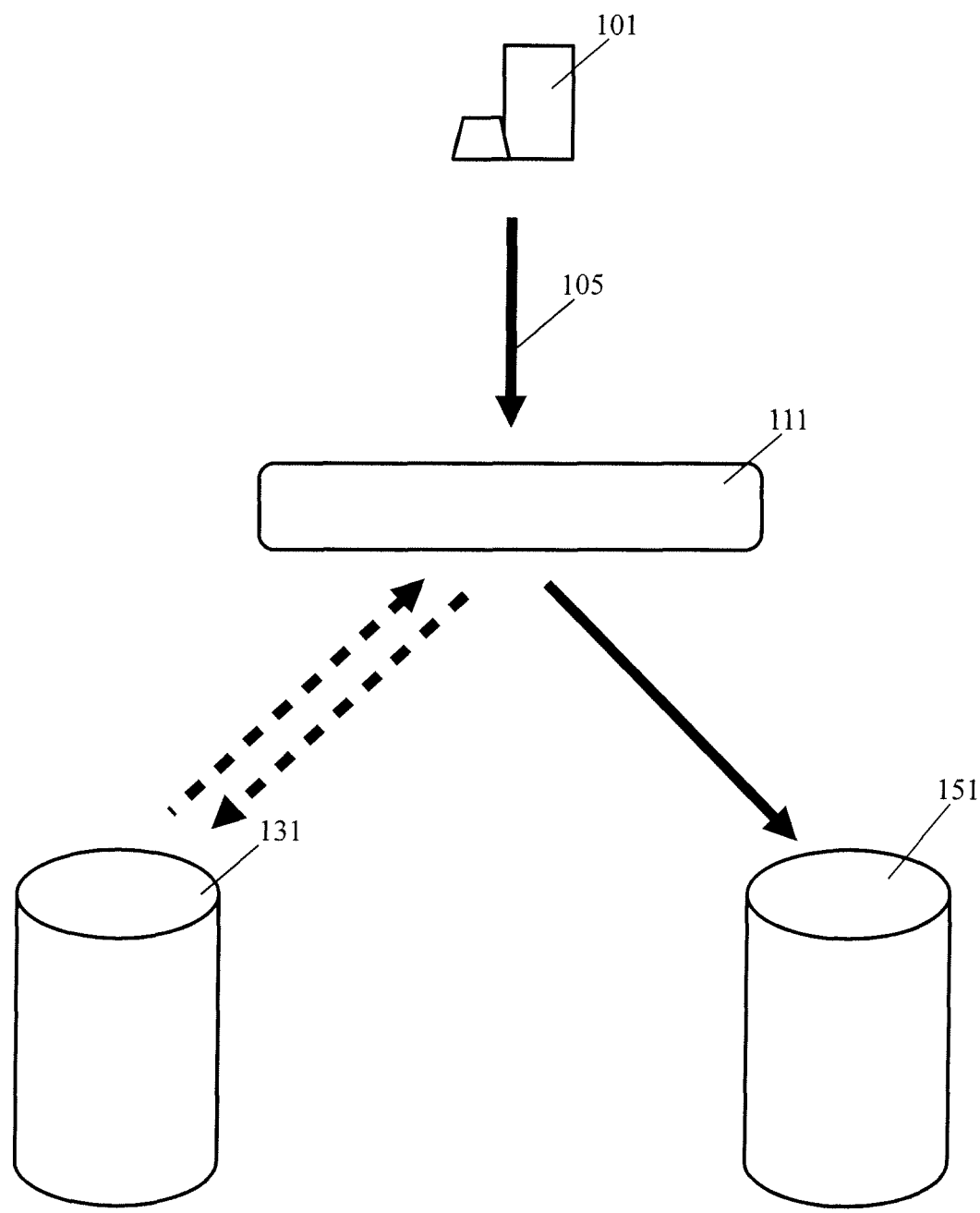
FIG. 1 is an exemplary block diagram depicting the elements of a storage virtualization system, according to one embodiment of the present invention.

FIG. 1 illustrates one exemplary setup for a storage virtualization system. The client 101 accesses a source NAS system 131 connected to a network 105. The storage virtualization system 111 is an intermediary that may cause data from the source NAS system 131 to be re-directed, migrated or copied to the destination NAS system 151. One will appreciate that FIG. 1 is merely an example of how a storage virtualization system 111 might interact with a source NAS system 131 and a destination NAS system 151, and that other setups are possible without departing from the scope of the present disclosure.

The present invention is described with reference to NAS systems using the Common Internet File System ("CIFS") protocol. One skilled in the relevant art will appreciate that aspects of the present invention are equally applicable to other protocols common with NAS systems, such as the Network File System ("NFS") protocol. Regardless of the protocol used by the NAS system, it is possible to use a storage virtualization system to effect data synchronization or re-direction between more than one NAS system. One will appreciate that data re-direction is a process whereby data files intended for storage in a primary source server are actually re-directed by the storage virtualization system to a secondary destination server. Synchronization is a real-time or near real-time mirroring of user requests and data file actions between the source sever and the destination server. Both re-direction and synchronization may be performed without notifying the user, and may be deployed by the IT administrator using automated processes or manual command line interactions.

Data re-direction may involve use of the source server's security protocols. In data re-direction, the user may request access to the source server, which may require user account authentication. This request may pass through the storage virtualization system, since the storage virtualization system may be an intermediary between the user client computer and the source server. The storage virtualization system may assume the identity of the user as a user delegate and may be authenticated as the user. This may involve aspects of the Kerberos delegation protocol or other similar security protocol known in the art. Through the storage virtualization system, the user performs actions on the data as if interacting with the source, but the user requests may be transparently re-directed to the destination server, where the data actually resides. In this scenario, the storage virtualization system must re-direct user requests as a user delegate in order to preserve access controls. All access control lists and file permissions must be set as if the user set them. If the storage virtualization system takes on the identity of a more privileged user, such as a root user, administrator or "superuser," the data or data file permissions would not match those on the server.

Where data is being re-directed from one domain to another domain, the storage virtualization system may not be able to interact between the two domains without the added functionality provided by the present invention. This is because some NAS systems that authenticate users using the Kerberos delegation protocol may not permit cross domain authentication or file permissions transfer. Specifically, the Kerberos delegation protocol may not permit cross domain user delegation. As a result, user and/or file permissions may not transfer properly to the new domain. It is therefore an aspect of the present invention to act as a bridge to seamlessly effect data re-direction to a destination NAS system having a different domain than the source NAS system. An aspect of the present invention calls for a "user identity translation" from the source server domain to the destination server domain, before permitting delegation within the destination domain. Since the user has presumably had prior access to the former domain, and is now requesting access to a new domain server (delegated to the storage virtualization system), the present invention may apply the user's previous security credentials to establish access to the new domain server.

Specifically, the present invention provides a two-step translation process that translates or associates the user account's prior security identity (SID) for the source NAS system, to a new SID for the destination NAS system. The new SID may either be selected by the user or automatically created by the storage virtualization system. The present invention may require that the storage virtualization system create a database or internal table of user access codes, login identities, account names, SIDs or the equivalent. This database may be include a table of user access privileges to the source server that will need to be matched to create consistent permissions on the destination server. As such, the database will correlate older user access codes for the source NAS system with new user access codes to the destination NAS system. One will appreciate that this information can be contained in a single database or multiple databases or part of another database. It may be encoded in XML or other computer-readable code in order to effect translation of user names and credentials between the source and destination NAS systems. The database may contain mapping information, software instructions, or other components necessary to enable aspects of the present invention. One will also appreciate that while the present invention discloses storing source NAS system and destination NAS system user information in a database, the database may be a list, a table, or other collection of data, so long as the storage virtualization system can refer to the data in order to translate source server user information to destination server user information.

Figure 2:
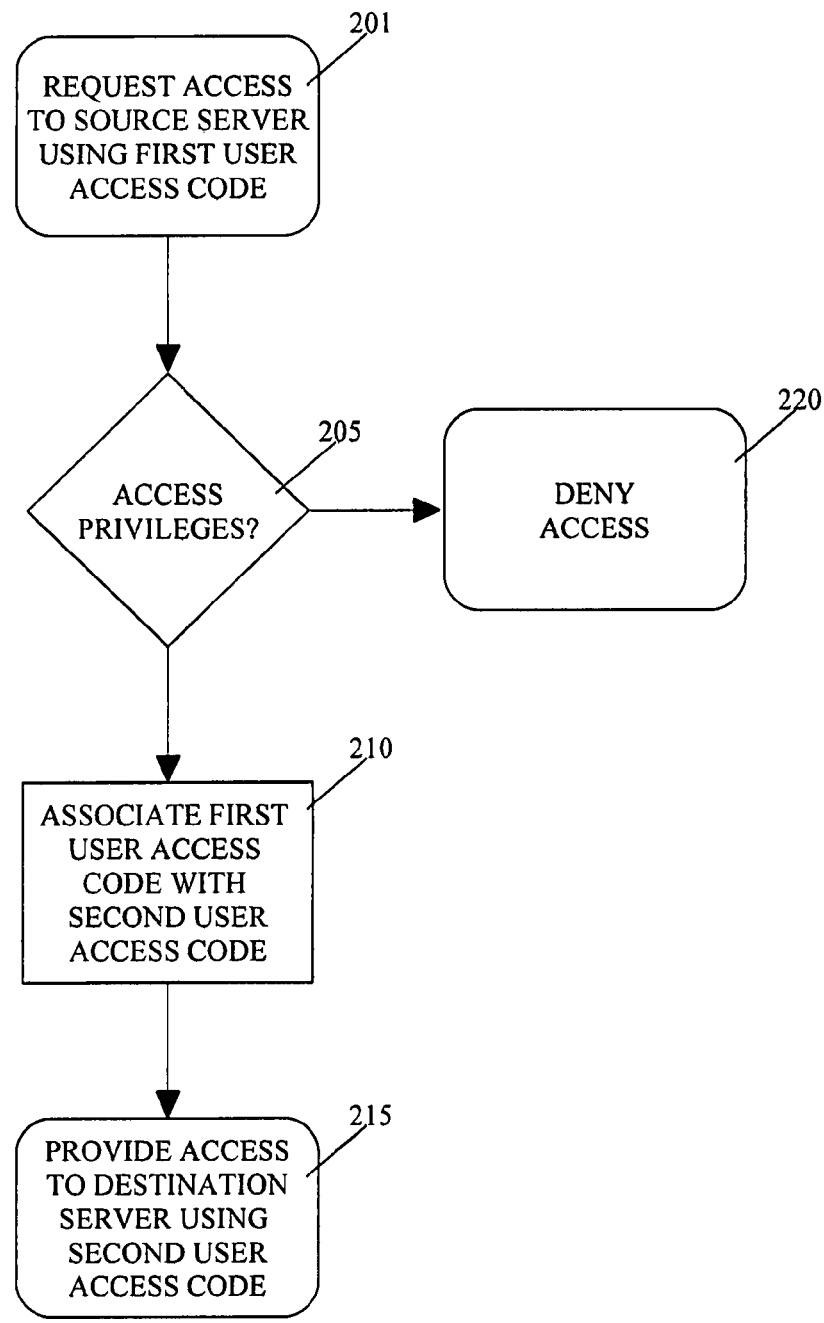
FIG. 2 is an exemplary flow diagram illustrating the steps of an embodiment of the present invention.

FIG. 2 illustrates a flow chart of an exemplary method for the present invention. In order to enable aspects of the present invention, a user may request access the source server, request access to a file on the source server or perform other actions on the source server through the storage virtualization system (step 201). The storage virtualization system, sensing that a user wishes to access a source server whose files may be re-directed to a new domain destination server, will check to see if the user has permission to access the source server (step 205). This may comprise comparing the user name against a list or database of stored user names. If the user does not have access privileges to the source server, then access will be denied (step 220).

If the user does have confirmed access to the source server, then the storage virtualization system may check to see if the user has been granted access to the new domain destination server. If so, then the storage virtualization system may use an internal database or list or table to translate the source server user name to a destination server user name. This database or list or table may be stored in the storage virtualization system or accessed by the storage virtualization system. In another embodiment, the storage virtualization system may simply perform the translation of the user's source server credentials to user credentials for the destination server without performing the check to see if the user has destination server access (step 210).

Once the user name or SID has been matched, then the storage virtualization server may act as the user's delegate on the destination server, providing access to the destination server using the translated SID, or allowing files to be stored in the destination server with appropriate access controls and file permissions (step 215). The user may not know that his account or associated files have been redirected to a new domain; however, in the future transactions, the user may also be advised to use the new destination server user name or SID.

In another embodiment, the user may be trying to store files on the source server. The present invention will cause those files to be saved to the destination server. Any file permissions associated with the file will likewise transfer to the destination server. One will appreciate that the steps described herein and illustrated in the figures are merely exemplary, and may be performed in a different order or in a different fashion, so long as the goal of the present invention is accomplished, that is, effecting user account and/or user file re-direction or migration from a source server to a destination server having different domain names. One will appreciate that other steps may be added, skipped or varied without departing from the present disclosure or the spirit of the invention. For example, various software instructions may need to be added to the storage virtualization system's operating system in order to enable the present invention.

When the user account, SID and/or user files are re-directed to the destination server using the present invention, file permissions and access control lists associated with those files may also carry over to the new domain. For example, the present invention may provide that for each user security ID credential in the source server's domain (called the source SID), the storage virtualization system may allow the user to define an security-equivalent user ID in the destination domain (called the destination SID). During the delegated authentication process, if the storage virtualization system further authenticates using Kerberos delegation protocol, then it may request the credentials of the destination SID from the destination domain server's dedicated Kerberos authentication server. Further, during the data migration and synchronization process, the SIDs or access control attributes for each of the user's files on the source server domain are translated by the storage virtualization system. The storage virtualization is therefore provided with the capability to match prior server domain permissions to destination domain permissions. As a result, the access control attributes and corresponding security rules are kept consistent on both the source and destination servers.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto. For example, while specific embodiments of the present invention are directed to CIFS NAS systems, aspects of the present invention may apply equally to other protocols of NAS systems as well without departing from the spirit of the present invention or the scope of this disclosure. As a further example, the present invention is described with reference to user authentication using the Kerberos delegation protocol. One will appreciate that an embodiment of the present invention may also be used to enable cross domain delegation in other security protocols.

What is claimed is:

1. A method comprising:
providing a storage virtualization system that communicates with a first network attached storage ("NAS") system and a second NAS system on a network, wherein the first NAS system and the second NAS system have different domain names, and wherein the storage virtualization system stores a first user access code for accessing the first NAS system;
storing on the storage virtualization system a second user access code for accessing the second NAS system;
receiving a request to store a file having permission on the first NAS system using the first user access code;
determining that storage of the file on the first NAS system is permitted using the first user access code;
associating by the storage virtualization system the second user access code with the first user access code, based on the storage of the file on the first NAS system being permitted using the first user access code; and
providing, in response to the request, storage of the file by the storage virtualization system to the second NAS system using the second user access code and not storing the file having permissions on the first NAS system.

2. The method of claim 1, wherein the first user access code is a first user security identity and the second user access code is a second user security identity.

3. The method of claim 1, wherein the first user access code is a first user name and the second user access code is a second user name.

4. The method of claim 1, wherein the first user access code is a first login identity and the second user access code is a login identity.

5. The method of claim 1 wherein the request comprises an attempt by a user to access a file, stored on the second NAS system, that had been stored on the first NAS system.

6. The method of claim 1 wherein the request comprises an attempt by a user to store a file on the first NAS system and the method comprises:
storing the file on the second NAS system.

7. The method of claim 1 wherein the associating the second user access code with the first user access code comprises:
associating user access privileges allowed on the first NAS system with the second user access code to permit the same user access privileges on the second NAS system.

8. A method comprising:
providing a storage virtualization system that communicates with a first network attached storage ("NAS") system and a second NAS system on a network, wherein the first NAS system and the second NAS system have different domain names, and wherein the storage virtualization system stores a first user access code for accessing the first NAS system;
storing on the storage virtualization system a second user access code for accessing the second NAS system;
transmitting a request from a user to store a file having permissions on the first NAS system using the first user access code;
if the user has an access privilege that allows storage of the file having permissions on the first NAS system, associating, by the storage virtualization system, the second user access code with the first user access code, not storing the file having permissions on the first NAS system, and storing, in response to the request, the file having permissions on the second NAS system using the second user access code; and if the user does not have the access privilege that allows storage of the file having permissions on the first NAS system, not storing the file on the second NAS system.

9. The method of claim 8, wherein the first user access code is a first user security identity and the second user access code is a second user security identity.

10. The method of claim 8, wherein the first user access code is a first user name and the second user access code is a second user name.

11. The method of claim 8, wherein the first user access code is a first login identity and the second user access code is a login identity.

12. A system comprising:
a memory; and
a software module resident on a storage virtualization system, wherein the software module contains computer instructions for monitoring requests for access to a first NAS system using a first user access code, for checking if storage of a file on the first NAS system is permitted, for associating the first user access code with a second user access code, when storage of the file on the first NAS system is permitted, for providing, in response to the requests for storage of the file on the first NAS system, storage of the file on the second NAS system using the second user access code and not on the first NAS system, when access to the first NAS system is permitted, and for denying storage of the file on the second NAS system when access to the first NAS system is not permitted.

13. The system of claim 12, wherein the software module further contains computer instructions for monitoring for a request for storage of a file having permissions on the first NAS system, and storing the file having permissions on the second network attached storage system.

14. The system of claim 12, wherein the first user access code is a first user security identity and the second user access code is a second user security identity.

15. The system of claim 12, wherein the first user access code is a first user name and the second user access code is a second user name.

16. The system of claim 12, wherein the first user access code is a first login identity and the second user access code is a login identity.

17. The method of claim 1 wherein the different domain names comprise different DNS domain names.

18. The system of claim 12 wherein the first NAS system includes a delegation protocol that does not support delegation across domains.

19. The system of claim 12 wherein the software module further contains computer instructions for if access to the first NAS system is permitted, not providing access to the first NAS system and providing access to the second NAS system, thereby redirecting a request for the first NAS system to the second NAS system.

20. A computer program product, comprising a non-transitory computer-readable medium having a computer-readable program code embodied therein to be executed by one or more processors, the program code including instructions to:
provide a storage virtualization system that communicates with a first network attached storage ("NAS") system and a second NAS system on a network, wherein the first NAS system and the second NAS system have different domain names, and wherein the storage virtualization system stores a first user access code for accessing the first NAS system;
store on the storage virtualization system a second user access code for accessing the second NAS system;
receive a request to store a file having permission on the first NAS system using the first user access code;
determine that storage of the file on the first NAS system is permitted using the first user access code;
associate by the storage virtualization system the second user access code with the first user access code, based on the storage of the file on the first NAS system being permitted using the first user access code; and
provide, in response to the request, storage of the file by the storage virtualization system to the second NAS system using the second user access code and not to the first NAS system.

* * * * *